US010953962B2

(12) United States Patent
Le Gleau et al.

(10) Patent No.: US 10,953,962 B2
(45) Date of Patent: Mar. 23, 2021

(54) FLOAT, NOTABLY FOR AN OFFSHORE WIND TURBINE

(71) Applicant: NAVAL ENERGIES, Paris (FR)

(72) Inventors: Anthony Le Gleau, Paris (FR); François Davy, Paris (FR)

(73) Assignee: NAVAL ENERGIES, Paris (FR)

(*) Notice: Subject to any disclaimer, the term of this patent is extended or adjusted under 35 U.S.C. 154(b) by 0 days.

(21) Appl. No.: 16/604,181

(22) PCT Filed: Apr. 11, 2018

(86) PCT No.: PCT/EP2018/059321
§ 371 (c)(1),
(2) Date: Oct. 10, 2019

(87) PCT Pub. No.: WO2018/189257
PCT Pub. Date: Oct. 18, 2018

(65) Prior Publication Data
US 2020/0062351 A1    Feb. 27, 2020

(30) Foreign Application Priority Data
Apr. 11, 2017 (FR) .................................. 1753158

(51) Int. Cl.
*B63B 35/44* (2006.01)
*F03D 13/25* (2016.01)
*B63B 35/38* (2006.01)

(52) U.S. Cl.
CPC .............. *B63B 35/44* (2013.01); *B63B 35/38* (2013.01); *F03D 13/25* (2016.05); *B63B 2035/446* (2013.01)

(58) Field of Classification Search
CPC ....... B63B 35/00; B63B 35/003; B63B 35/40; B63B 35/44; B63B 2035/4433; B63B 2035/446; B63B 35/38; F03D 13/25
USPC ........................................... 114/256, 264–267
See application file for complete search history.

(56) References Cited

U.S. PATENT DOCUMENTS

| 9,394,035 B2* | 7/2016 | Dagher ...................... B63B 5/20 |
| 10,087,915 B1* | 10/2018 | Srinivasan .............. F03D 13/22 |
| 10,337,499 B1* | 7/2019 | Srinivasan .............. F03D 13/10 |

FOREIGN PATENT DOCUMENTS

| WO | 2010/029766 A1 | 3/2010 |
| WO | 2013/155521 A1 | 10/2013 |
| WO | 2014/031009 A1 | 2/2014 |
| WO | 2016/138088 A1 | 9/2016 |

OTHER PUBLICATIONS

International Search Report, dated May 15, 2018, from corresponding PCT application No. PCT/EP2018/059321.
French Search Report, dated Nov. 24, 2017, from corresponding French patent application No. 17 53158.

* cited by examiner

*Primary Examiner* — Daniel V Venne
(74) *Attorney, Agent, or Firm* — Nixon & Vanderhye

(57) ABSTRACT

Disclosed is a float, notably for an offshore wind turbine including at least four columns, including a central column and three exterior columns that are connected to the central column by branches forming pontoons. The columns have a fixing-collar forming unit for fixing the columns to corresponding assembly portions of the branch forming pontoon, and the float includes a unit for centering the columns in the assembled position on the corresponding assembly portions of the branch forming pontoon.

10 Claims, 4 Drawing Sheets

FLOAT, NOTABLY FOR AN OFFSHORE WIND TURBINE

BACKGROUND OF THE INVENTION

The present invention relates to a float, in particular, of an offshore wind turbine.

Such floats are already known from the prior art, such as, for example, from WO 2014/031009 A1.

This document describes a float having at least four columns, for example of steel, including a central column, and three outer columns connected to the central column by branches forming pontoons, for example in concrete.

In this document, the outer columns are connected to the central column in a star configuration.

The outer columns and the branches forming pontoons of this float comprise ballasts for adjusting the buoyancy of the float.

For the construction of this type of float 1, the branches forming pontoons 8 and the columns 3, 12 are manufactured separately in a first step and then assembled on top of one another in a second step.

This float construction step then consists in assembling the columns 3, 12 with branches forming pontoons 8 on corresponding assembly portions of these branches 8.

But this type of float presents problems of assembly of the columns on the branches forming pontoons.

In particular, there is the problem of assembling columns quickly and securely on the corresponding branches.

For example, this assembly is carried out using machines such as handling cranes, which may not have all the required precision.

In addition, adverse weather conditions may also disrupt this assembly.

SUMMARY OF THE INVENTION

One of the aims of the invention is to overcome the above drawbacks by proposing a wind turbine float, in particular of an offshore wind turbine, the design of which allows rapid and secure assembly of the columns on the branches forming pontoons.

For this purpose, the invention relates to a float, in particular for an offshore wind turbine, of the above-mentioned type in which the columns comprise fixing-collar forming means for fixing them on corresponding assembly portions of the branch forming pontoon, the float comprising centering means of the columns in the assembly position on the corresponding assembly portions of the branch forming pontoon.

According to other features of the float according to the invention, taken alone or in combination:

- the centering means comprise centering pins distributed on the branch forming pontoon and fixed thereto, and designed to cooperate with corresponding holes in the fixing-collar forming means of the columns, for centering the columns on the branch forming pontoon, during their assembly.
- each centering pin comprises two parts detachable from each other, the first part forming a body being fixed on the branch forming pontoon and the second part forming a removable head portion, being detachably fixed on the first part in order to remove the second part forming the head.
- the second part forming the removable head of each centering pin has a generally frustoconical shape.
- the float comprises guide means for guiding the columns in the assembly position on the corresponding assembly portions of the branch forming pontoon.
- the guide means comprise peripheral guide tabs distributed on the branch forming pontoon, around the corresponding assembly portions of the branch forming pontoon and inclined outwards therefrom, to guide the column in the assembly position on the corresponding assembly portion.
- the float comprises inclination adjustment means of the or each column relative to the branches forming pontoons.
- the inclination adjustment means comprise at least one adjustment cylinder.
- the inclination adjustment means are designed to be interposed between the first parts forming the bodies of the centering pins and corresponding bearing portions of the column.
- the or each corresponding bearing portion of the column is provided in a cylinder stand of this column.

BRIEF DESCRIPTION OF THE DRAWINGS

The invention will be better understood upon reading the description which follows, given solely by way of example and with reference to the appended drawings, in which.

DETAILED DESCRIPTION OF THE PREFERRED EMBODIMENTS

Figure 1:
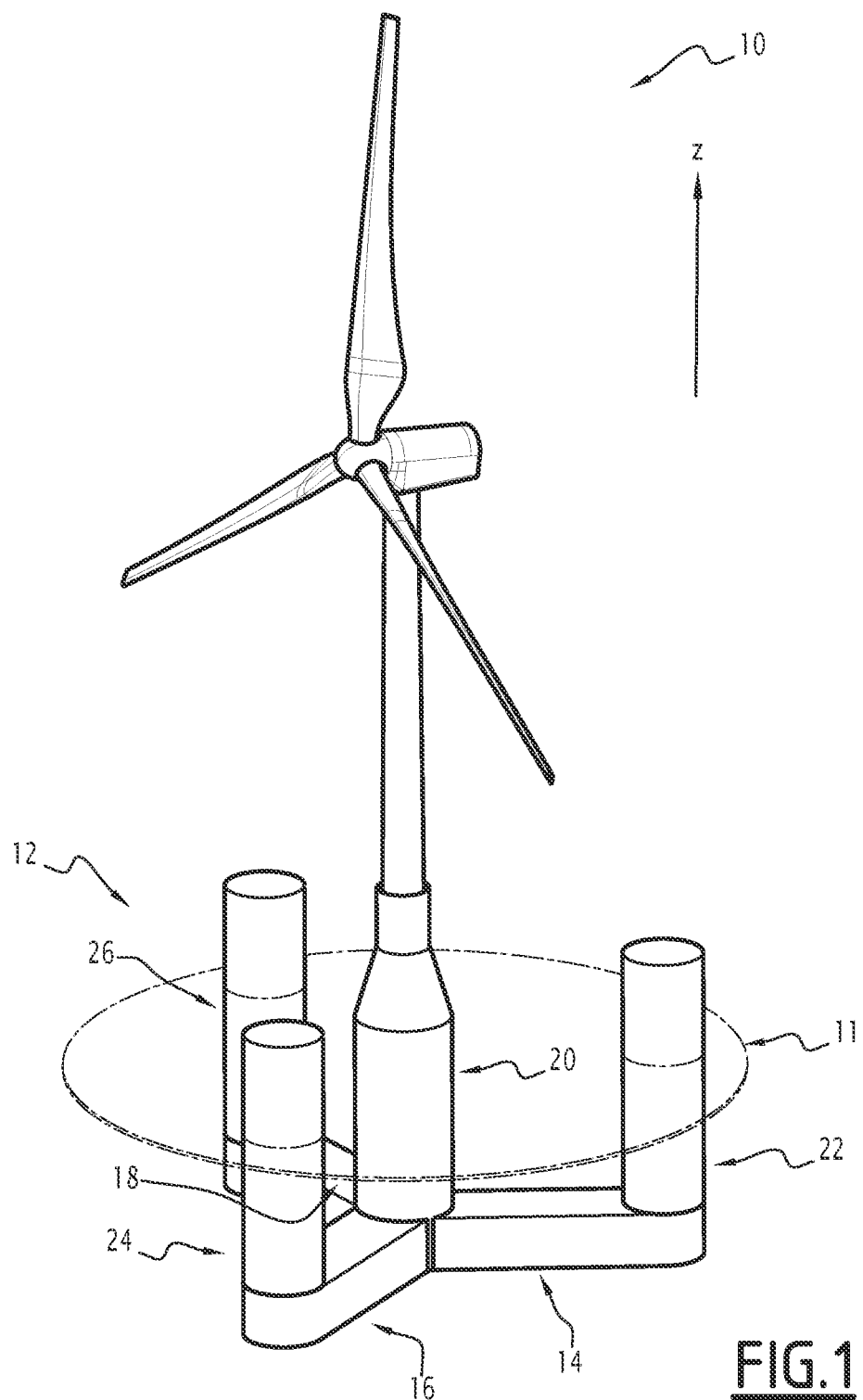
FIG. 1 shows a schematic perspective view of an exemplary embodiment of an offshore wind turbine float according to the invention.

An offshore wind turbine is shown in FIG. 1 and is designated by the reference 10.

The wind turbine 10 comprises a float designated by the reference 12.

The present description defines a vertical direction, represented by the Z axis in the figures, and named "vertical direction Z" in the present description. The vertical direction Z is the normal direction to the plane of the sea, designated by reference 11.

In the present description, the terms "lower" and "upper" are relative terms.

Thus the distance between the sea level and a lower element, measured in the vertical direction Z is smaller than the distance between the sea level and an upper element, measured in the vertical direction Z.

The float 12 is, for example, a so-called "hybrid" float.

In the present description, the term "hybrid" is understood to mean a float using at least two different materials for producing different parts of the float 12.

The float 12 comprises three branches forming pontoons, identified in FIG. 1 by the references 14, 16 and 18.

The branches 14, 16 and 18 forming pontoons are arranged in the form of a star in the example described, i.e. the branches 14, 16 and 18 extend radially about an axis parallel to the direction vertical Z.

The branches 14, 16 and 18 forming pontoons are made, for example, of concrete.

Of course, these branches may be made of other materials, such as composite materials.

These branches 14, 16 and 18 forming pontoons have, for example, a parallelepiped shape.

Thus, they have a polygonal section, such as a square or rectangular section.

The float 12 further comprises at least four columns, for example of steel, including a central column, designated by the reference 20, and three outer columns designated by the references 22, 24 and 26.

Other materials than steel, may also be used to make these columns, such as composite materials.

The columns 20, 22, 24 and 26 have a cylindrical shape with an axis parallel to the vertical direction Z.

These columns 20, 22, 24 and 26 have a circular section in a plane normal to the vertical direction Z.

The outer columns 22, 24 and 26 are connected to the central column 20 by the branches 14, 16 and 18 forming pontoons of the float 12.

In the exemplary embodiment of the float 12 shown in FIG. 1, the outer columns 22, 24 and 26 are each positioned on one end of a branch 14, 16 and 18 forming pontoons.

Conventionally, in this type of offshore wind turbine float, the branches 14, 16 and 18 forming pontoons and the outer columns 22, 24 and 26, comprise ballasts.

Figure 2:
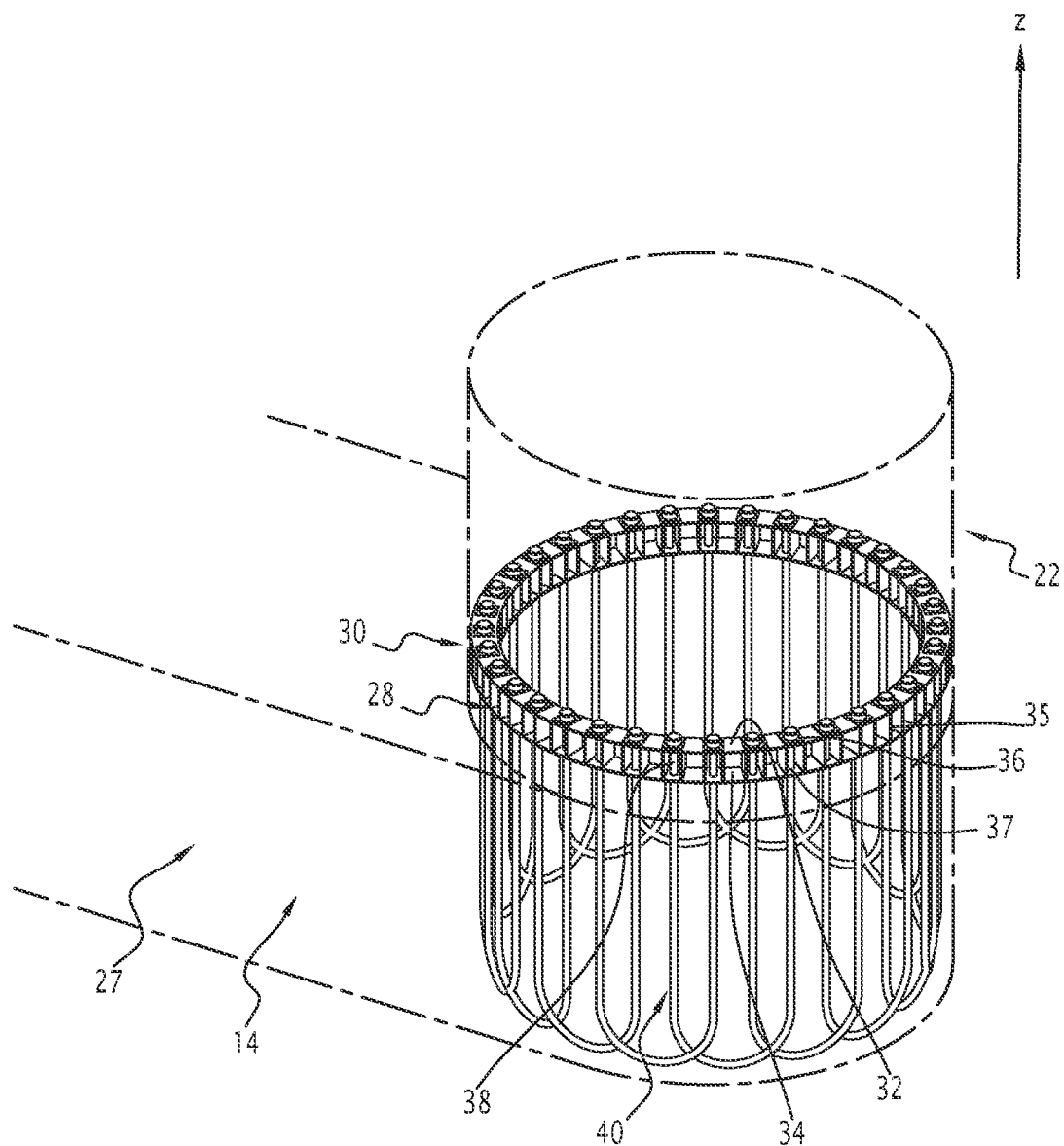
FIG. 2 shows a view with transparent portions illustrating the fixing of a column on a branch forming pontoon of a float of FIG. 1.

In FIG. 2 may be seen the column 22 and the branch 14 forming pontoon comprising a ballast designated by the reference 27.

In the remainder of the description, only the fixing of the outer column 22 to the corresponding branch 14 forming pontoon will be described in detail.

This description applies identically to the other outer columns 24 and 26 and to the arrangement of these other outer columns on the corresponding branches forming pontoons.

Referring to FIG. 2, the column 22 is shown in the assembly position on the branch 14 forming pontoon.

The column 22 is positioned on an assembly portion of the branch 14, designated by the reference 28.

The assembly portion 28 corresponds to the portion of the branch 14 on which the column 22 is mounted.

More specifically, the assembly portion 28 corresponds to the area of an upper face of the branch 14 covered by the column 22.

In the case in point, the column 22 has a circular section in a plane normal to the vertical direction Z.

Thus, the assembly portion 28 of the column 22 on the branch 14 substantially corresponds to the surface of a disk of an upper face of the branch 14 having the same radius as the section of the column 22.

The column 22 comprises fixing-collar forming means for fixing this column on the assembly portion 28.

The fixing-collar forming means for fixing the outer column 22 on the branch 14 forming pontoon are visible in FIG. 2, and designated by the reference 30.

The fixing-collar forming means 30 are arranged inside the column 22, at a lower end of this column.

The fixing-collar forming means 30 protrude radially from an inner face of the column 22.

In the present description, the term "internal face" is understood to mean a face disposed in the interior volume of the column 22.

In the example shown in FIG. 2, the fixing-collar forming means 30 comprise, for example, an upper annular diaphragm and a lower annular diaphragm spaced apart and parallel to each other in the vertical direction Z, designated in FIG. 2 by the references 32 and 34. The upper annular diaphragm 32 and the lower annular diaphragm 34 form, respectively, an upper wall and a lower wall of the fixing-collar forming means 30.

The upper diaphragm 32 and the lower diaphragm 34 are made of material attached to the inner face of the column 22. The fixing-collar forming means 30 may be made integral with the column 22 or be in the form of separate parts fixed, for example, by welding.

Moreover, as visible in FIG. 2, the fixing-collar forming means 30 are mechanically welded. In fact, the reinforcing vanes or fins, one of which is designated by the reference 35, are arranged regularly between the upper diaphragm 32 and the lower diaphragm 34, to reinforce the fixing-collar forming means 30.

For example, the fixing-collar forming means 30 may be made of steel.

The fixing-collar forming means 30 have tensioning cable through holes.

These through holes are arranged to face each other in the upper diaphragm 32 and in the lower diaphragm 34 in the vertical direction Z.

These holes are, for example, respectively designated by the references 36 and 37.

For example, the through holes 36 and 37 are regularly distributed over the circumference of the upper diaphragm 32 and the lower diaphragm 34.

As shown in FIG. 2, the tensioning cables, one of which is designated 38 in FIG. 2, are, for example, each placed in a protective sheath, one of which is designated by the reference 40 in FIG. 2. For example, before threading the tensioning cables 38 through the protective sheaths 40, the protective sheaths 40 are embedded in the concrete of the branch 14 forming pontoon.

The ends of the cables 38 protrude, for example, above the branch 14 forming pontoon in order to allow fixing of the column 22 on this branch 14.

By placing several cables 38 in this manner in a circle in each branch 14, 16 and 18, a ring of elements protruding from each branch is obtained, making it possible to fix the corresponding outer column on the respective branch forming pontoon. In particular, the ring of protruding elements of the column 22 protrude from the assembly portion 28 of this column 22 on the branch 14 forming pontoon.

As may be seen in FIG. 2, the ends of the tensioning cables 38 protruding above the branch 14 pass through the corresponding holes 36 and 37 of the fixing-collar forming means 30.

Of course, other fasteners such as, for example, tensioning bars, tie rods or studs, may be used.

The float 12 further comprises fixing means which cooperate with the ends of the tensioning cables 38 to fix the fixing-collar forming means 30 to the tensioning cables 38.

The tensioning makes it possible to eliminate studs (of the Nelson type, for example), because it ensures a resumption of pure friction shear.

Figure 3:
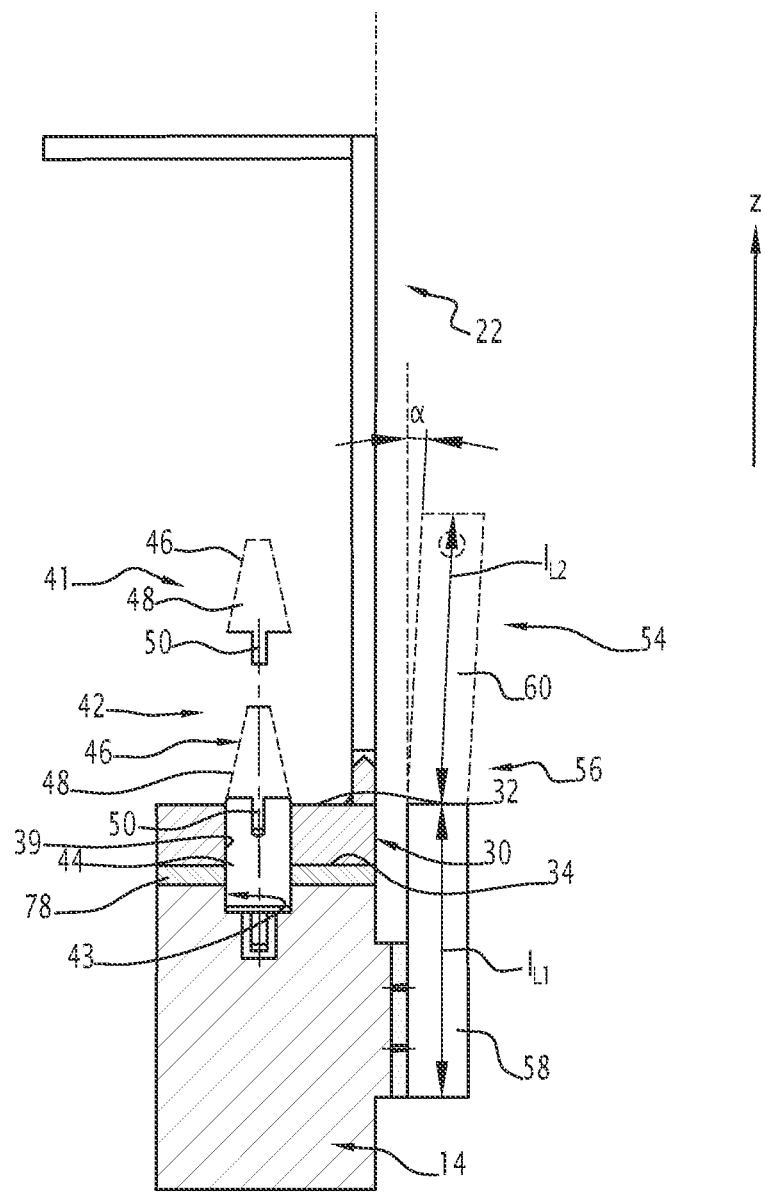
FIG. 3 shows a sectional view of a portion of a branch forming pontoon and a portion of a column, and shows the fixing of a column on a branch forming pontoon of the float of FIG. 1.
Figure 4:
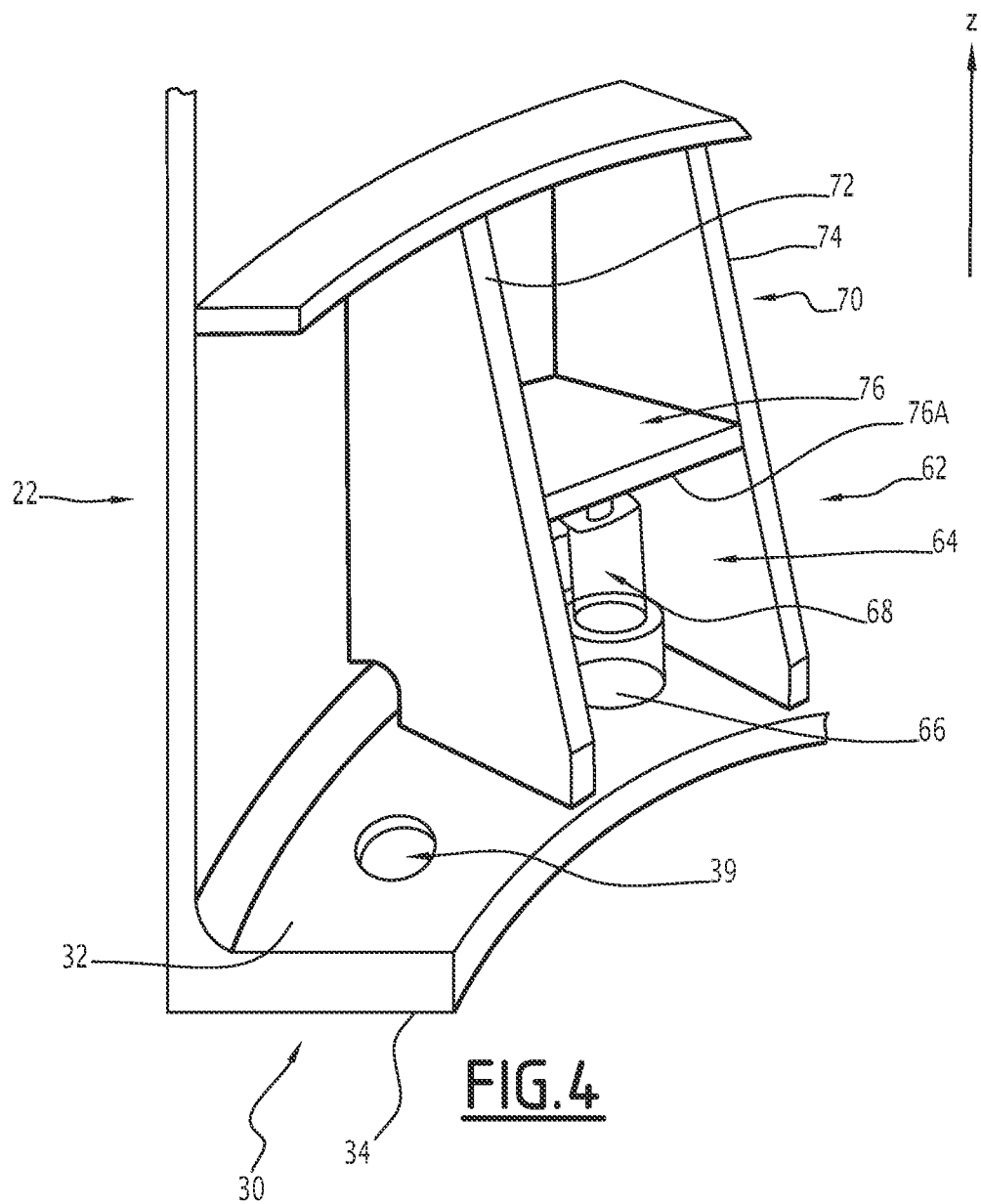
FIG. 4 shows a view of the inside of a column of the float of FIG. 1.

In other exemplary embodiments, as visible in FIGS. 3 and 4, the fixing-collar forming means 30 are solid. In other words, the space between the upper diaphragm 32 and the lower diaphragm 34 is filled with material.

The fixing-collar forming means 30 have through holes 39. One of these through holes is designated by the reference 39.

The through holes 39 pass through the thickness of the fixing-collar forming means 30 and are regularly distributed on the circumference of the fixing-collar forming means 30.

The ends of the tensioning cables 38 protruding above the branch 14, pass through the corresponding through holes 39 of the fixing-collar forming means 30 and are fixed by the fixing means to the fixing-collar forming means 30.

The fixing-collar forming means 30 may be made in one piece with the column 22, or be in the form of separate parts secured, for example, by welding thereon.

With reference to FIG. 3, the float 12 comprises column 22 centering means in the assembly position on the assembly portion 28.

These centering means are designated by the general reference 41.

These centering means comprise centering pins designated by the reference 42.

This figure shows the column 22, the fixing-collar forming means 30 and the branch 14 forming pontoon.

The centering pins 42 are distributed, for example, regularly on the assembly portion 28 of the column 22.

In particular, the centering pins 42 are regularly distributed circumferentially on a periphery of the assembly portion 28 so as to cooperate with corresponding through holes 39 of the fixing-collar forming means 30.

The centering pins 42 are fixed in openings formed in the branch 14 forming pontoon, one of which is designated by the reference 43.

Each centering pin 42 comprises two parts detachable from one another, a first part designated by the reference 44, forming a body, and a second part, designated by the reference 46, forming a removable head.

One end of the body 44 of the centering pin 42 is fixed in a fixing hole 43. The other end of the body 44 of the centering pin 42 protrudes from the branch 14 forming pontoon.

The removable head 46 of the centering pin 42 is removably attached to the body 44 of said pin 46 in order to be separated from this body.

The removable head 46 has a generally frustoconical shape.

More specifically, the removable head 46 has a frustoconical upper portion, designated by the reference 48, and a lower portion, designated by the reference 50, designed to be received in a corresponding opening 52 formed in one end of the body 44 of the centering pin 42.

As may be seen in FIG. 3, the removable head 46 of the centering pin 42 protrudes fixing-collar forming means 30.

In particular, the frustoconical upper portion 48 of the removable head 46 of the centering pin 42 protrudes from the upper diaphragm 32 of the fixing-collar forming means 30. In other words, the frustoconical upper portion 48 of the removable head 46 of the centering pin 42 protrudes from the upper face of the fixing-collar forming means 30.

For example, six centering pins 42 may be regularly distributed circumferentially on the branch 14.

In other exemplary embodiments, the float 12 may comprise more or fewer centering pins 42.

As also visible in FIG. 3, the float 12 further comprises guide means of the column 22 in the assembly position on the corresponding assembly portion 28.

These guide means are designated by the reference 54 in FIG. 3.

The guide means 54 comprise peripheral guide tabs for the column 14, one of which is designated by the reference 56.

The peripheral guide tabs 56 are distributed around the assembly portion 28 of the column 14.

The peripheral guide tabs 56 each comprise a first portion designated by the reference 58, fixed on a peripheral face of the branch 14 forming pontoon, and aligned in the vertical direction Z.

For example, the first portions 58 of the peripheral guide tabs 56 are fixed to the peripheral face of the branch 14 forming pontoon, for example by studs.

Of course other means may be used.

The peripheral guide tabs 56 each comprise a second portion in the extension of the first portion 58, inclined outwards from the column 14, i.e. inclined at an angle relative to the vertical direction Z.

The second portions are designated 60 for tab 56.

The angle between each second portion 60 and the vertical direction Z is non-zero and is, for example, between 1 degree and 30 degrees. This angle is designated by the reference a in FIG. 3.

As a variant, for example, in the up and down sense in the vertical direction Z, the second portions 60 of the peripheral guide tabs 56 may be inclined by 30 degrees over a length of 1 meter (m) measured in the vertical direction Z, then 3 degrees over a length of 2 m measured in the vertical direction Z.

For example, the first portion 58 of the peripheral guide tab 56 and the second portion 60 of the peripheral guide tab 56, each measure 2 m.

The length of the first portion 58 of the peripheral guide tab 56 corresponds to the distance measured between the two ends of said first portion 56, while the length of the second portion 60 of the peripheral guide tab 56 is the distance between the two ends of said second portion 60.

The length of the first portion 58 is identified by the reference $I_{L1}$, while the length of the second portion 60 is identified by the reference $L_{L2}$ FIG. 3. The peripheral guide tabs 56 are, for example, of steel.

Alternatively or additionally, the peripheral guide tabs 56 may also be fixed by their first portion 58 on an upper face of a branch 14 forming pontoon.

The guide tabs guide the column 22 onto the corresponding assembly portion 28 of the branch 14 forming pontoon, during assembly thereof.

In addition, with reference to FIG. 4, the float 12 comprises inclination adjustment means for the column 22 with respect to the branches 14, 16 and 18 forming pontoons, designated by the reference 62 in FIG. 3.

The inclination adjustment means 62 of the column 14 comprise at least one adjustment cylinder, designated by the reference 64.

This cylinder 64 comprises a body, designated by the reference 66 and a movable head, designated by the reference 68.

The body 66 of the cylinder 64 is designed to cooperate with the body 44 of a centering pin 42 when the removable head 46 of the centering pin 42 is removed from the body 44 of the pin 42, while the movable head 68 of the cylinder 64 is designed to cooperate with a corresponding bearing portion 76A of the column 22.

The inclination adjustment means also comprise, for example, a cylinder stand, designated by the reference 70.

The cylinder stand 70 comprises two parallel walls 72 and 74 resting on a portion of the upper diaphragm 32. In other words, the parallel walls 72 and 74 bear against the upper face of the fixing-collar forming means 30.

The inclination adjustment means 62 further comprise an abutment panel, designated 76, extending in a plane normal to the vertical direction Z, and from the inner face of the column 22, between the walls 72 and 74.

The abutment panel 76 is disposed inside the cylinder stand 70, and is integral with the parallel walls 72 and 74.

The lower face of the abutment panel 76 defines the bearing portion 76A of the column 22 on which the head 68 of the cylinder 64 is able to bear.

The column 22 may comprise several cylinder stands 70, evenly distributed inside the column 22.

The cylinder stands 70 are positioned inside the column 22 so as to be arranged opposite a centering pin 42.

Similar arrangements are provided between the other outer columns and the corresponding ends of the branches forming pontoons.

Similar or equivalent means are used to ensure the attachment and adjustment of the central column on the corresponding end portions of these branches forming pontoons.

A method of assembling the columns on the branches forming pontoons is described in the following description.

This method is described with regard, for example, to the column 22 on the branch 14.

A first step of the assembly method is a step of handling and guiding the column 22 to the assembly portion 28 of the branch 14.

During this step, the column 22 is guided by the peripheral guide tabs 56 above the assembly portion 28 of the branch 14.

This step makes it possible to align the column 22 with the assembly portion 28 of the branch 14.

This step also makes it possible to avoid the large amplitude movements of the column 22 when it reaches the same level as the operators positioned on the float 12.

A second step of the assembly method is a step of centering the column 22 in the assembly position on the corresponding assembly portion 28.

During this step, the column 22 is positioned on the assembly portion 28 of the branch 14.

Through-holes 39 of the fixing-collar forming means 30 cooperate with the removable head 46 of the centering pins 42 to correctly center the column 22 on the corresponding assembly portion 28.

At the end of the second step of the assembly method, the head 46 of each of the centering pins 42 protrudes from the upper diaphragm 32.

A third step of the assembly method is an inclination adjustment step of the column 22 relative to the branch forming pontoon.

First, the head 46 of the centering pins 42 is detached from the body 44 of these centering pins 42 and removed, as may be seen, in particular, in FIG. 3.

Then, a cylinder 64 is assembled on the body of a centering pin 42.

The body 66 of the cylinder 64 is positioned in the opening of the body 44 of the centering pin 42.

The head 68 of the cylinder 64 is then activated to cooperate with a bearing portion 76A of the stop panel 76.

During this step, the head 68 of the cylinder 64 comes into contact with said bearing portion 76A.

Thus, it is understood that since the body 66 of the cylinder 64 bears on the branch 14 forming pontoon, and the head 68 of the adjustment cylinder 64 exerts a force against the abutment panel 76, it is possible to adjust the inclination of the column 22 relative to the branch 14 forming pontoon.

For example, during the mounting process, two cylinders 64 operate concomitantly.

Alternatively, at the same time as the inclination adjustment step or after this step, in the event of there being residual space between the upper surface of the branch 14 and the lower surface of the fixing-collar forming means 30, a levelling grout, such as concrete in liquid form may be injected between the upper face of the pontoon 14 and the underside of the fixing-collar forming means to fill said space.

Injected concrete is represented by reference 78 in FIG. 3.

A similar method may be applied to the assembly of the other outer columns 24, 26 and central column 20.

Once the columns 20, 22, 24, 26 mounted on the branches 14, 16, 18 forming pontoons, in a fourth step of the assembly method, the ends of the tensioning cables 38 are each threaded into a protection sheath 40. Then, the tensioning cables 38 are passed through the corresponding through holes 39 of the fixing-collar forming means 30 to be fixed to said collar 30.

This structure and method make it possible to simplify and accelerate the mounting of the columns and thus the floats and provide more safely for the float itself and its environment such as assembly operators.

Of course, other embodiments are conceivable.

The invention claimed is:

1. A float, comprising:
    at least four columns, including a central column and three outer columns connected to the central column by branches forming pontoons,
    each column among the central column and the three outer columns comprising fixing-collar forming means for fixing the column onto a corresponding assembly portion of a branch of said branches;
    centering means of the central column and the three outer columns, for centering each column among the central column and the three outer columns in the assembly position on the corresponding assembly portion of the branch of said branches; and
    guide means for guiding each column among the central column and the three outer columns in the assembly position on the corresponding assembly portion of the branch of said branches.

2. The float according to claim 1, wherein, for each column among the central column and the three outer columns, the centering means comprise centering pins distributed on the branch of said branches and fixed to the branch, and configured to cooperate with corresponding holes in the fixing-collar forming means of the column for centering the column on the corresponding assembly portion of the branch during assembly of the column.

3. The float according to claim 2, wherein each centering pin comprises first and second parts detachable from each other, the first part forming a body that is fixed on the branch, and the second part forming a removable head portion configured so as to be detachably affixed to the first part.

4. The float according to claim 3, wherein the second part of each centering pin has a generally frustoconical shape.

5. The float according to claim 1, wherein, for each column among the central column and the three outer columns, the guide means comprise peripheral guide tabs distributed on the branch of said branches, around the corresponding assembly portion of the branch and inclined outwards therefrom so as to guide the column in the assembly position on the corresponding assembly portion of the branch.

6. The float according to claim 1, further comprising:
    inclination adjustment means for adjusting each column among the central column and the three outer columns relative to the branches forming pontoons.

7. The float according to claim 6, wherein the inclination adjustment means comprise at least one adjustment cylinder.

8. The float according to claim 6,
wherein the centering means comprise, for each column among the central column and the three outer columns, centering pins distributed on the branch of said branches and fixed to the branch, and configured to cooperate with corresponding holes in the fixing-collar forming means of the column for centering the column on the corresponding assembly portion of the branch during assembly of the column,
wherein each centering pin comprises first and second parts detachable from each other, the first part forming a body that is fixed on the branch, and the second part forming a removable head portion configured so as to be detachably affixed to the first part, and
wherein, for each column among the central column and the three outer columns, the inclination adjustment means are configured to be interposed between the first part of the centering pin and a corresponding bearing portion of the column.

9. The float according to claim 8, wherein, for each column among the central column and the three outer columns, the corresponding bearing portion is provided in a cylinder stand of the column.

10. The float according to claim 1, wherein the float is an offshore wind turbine float.

* * * * *